United States Patent
Otis et al.

(10) Patent No.: US 7,893,386 B2
(45) Date of Patent: Feb. 22, 2011

(54) LASER MICROMACHINING AND METHODS OF SAME

(75) Inventors: Charles Otis, Corvallis, OR (US);
Mehrgan Khavari, Corvallis, OR (US);
Jeffrey R. Pollard, Corvallis, OR (US);
Mark C. Huth, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

(21) Appl. No.: 10/713,298

(22) Filed: Nov. 14, 2003

(65) Prior Publication Data

US 2005/0103758 A1    May 19, 2005

(51) Int. Cl.
*B23K 26/14* (2006.01)
(52) U.S. Cl. .................................. 219/121.84
(58) Field of Classification Search ................................
219/121.67–121.72, 121.84
See application file for complete search history.

(56) References Cited

U.S. PATENT DOCUMENTS

| | | | |
|---|---|---|---|
| 3,556,600 A | | 1/1971 | Shoupp et al. |
| 3,656,988 A | | 4/1972 | Steffen et al. |
| RE31,042 E | * | 9/1982 | Clark et al. ............ 219/121.66 |
| 5,068,513 A | | 11/1991 | Gangemi |
| 5,262,613 A | | 11/1993 | Norris et al. |
| 5,356,081 A | | 10/1994 | Sellar |
| 5,359,211 A | * | 10/1994 | Croft ......................... 257/173 |
| 5,460,284 A | | 10/1995 | Foltz et al. |
| 5,543,365 A | | 8/1996 | Wills et al. |
| 5,630,953 A | | 5/1997 | Klink |
| 5,658,471 A | | 8/1997 | Murthy et al. |
| 5,676,256 A | * | 10/1997 | Kumar et al. ............... 209/580 |
| 5,741,247 A | * | 4/1998 | Rizoiu et al. .................. 606/10 |
| 5,742,028 A | | 4/1998 | Mannava et al. |
| 5,747,771 A | | 5/1998 | O'Neill |
| 5,773,791 A | | 6/1998 | Kuykendal |
| 5,902,497 A | | 5/1999 | Alber et al. |
| 5,916,460 A | | 6/1999 | Imoto et al. |
| 6,120,131 A | | 9/2000 | Murthy et al. |
| 6,183,064 B1 | | 2/2001 | Murthy et al. |
| 6,262,390 B1 | | 7/2001 | Goland et al. |
| 6,281,473 B1 | | 8/2001 | Wright, III et al. |
| 6,323,456 B1 | | 11/2001 | Murthy et al. |
| 6,333,488 B1 | | 12/2001 | Lawrence et al. |

(Continued)

FOREIGN PATENT DOCUMENTS

DE    4138468    6/1993

(Continued)

OTHER PUBLICATIONS

EP04012252.5 Search Report, Mar. 9, 2005, Hewlett-Packard.

(Continued)

*Primary Examiner*—Samuel M Heinrich

(57) ABSTRACT

The described embodiments relate to laser micromachining a substrate. One exemplary method includes forming a feature into a substrate, at least in part, by directing a laser beam at the substrate. During at least a portion of said forming, the method includes supplying liquid to at least a first region of the feature along a first liquid supply path and supplying liquid to at least a second different region of the feature along at least a second liquid supply path.

8 Claims, 6 Drawing Sheets

U.S. PATENT DOCUMENTS

| | | |
|---|---|---|
| 6,384,371 B1 | 5/2002 | Hinei et al. |
| 6,388,231 B1 | 5/2002 | Andrews |
| 6,476,343 B2 | 11/2002 | Keicher et al. |
| 6,494,965 B1 | 12/2002 | Walker et al. |
| 6,512,198 B2 | 1/2003 | Eisele et al. |
| 6,555,779 B1 | 4/2003 | Obana et al. |
| 6,580,053 B1 * | 6/2003 | Voutsas .................. 219/121.66 |
| 6,583,383 B2 | 6/2003 | Higashi et al. |
| 6,586,707 B2 | 7/2003 | Boyle et al. |
| 2002/0050489 A1 | 5/2002 | Ikegami et al. |
| 2002/0106418 A1 | 8/2002 | Fukushima et al. |
| 2002/0170894 A1 | 11/2002 | Eisele et al. |
| 2003/0006220 A1 | 1/2003 | Cummings et al. |
| 2003/0062126 A1 | 4/2003 | Scaggs |
| 2003/0117449 A1 | 6/2003 | Cahill et al. |
| 2003/0127435 A1 | 7/2003 | Voutsas |
| 2003/0127441 A1 | 7/2003 | Haight et al. |
| 2004/0092925 A1 * | 5/2004 | Rizoiu et al. ................... 606/33 |
| 2004/0197433 A1 * | 10/2004 | Terada et al. ............. 425/174.4 |
| 2004/0256103 A1 * | 12/2004 | Batarseh ..................... 166/297 |

FOREIGN PATENT DOCUMENTS

| | | | |
|---|---|---|---|
| EP | 0761448 A3 | | 10/1997 |
| EP | 0993899 | | 4/2000 |
| EP | 0761448 B1 | | 11/2002 |
| JP | 359206189 A | * | 11/1984 |
| JP | 60018289 | | 1/1985 |
| JP | 63108990 | | 5/1988 |
| JP | 403052792 A | * | 3/1991 |
| JP | 405337676 A | * | 12/1993 |
| JP | 406246474 A | * | 9/1994 |
| JP | 08-318390 | | 12/1996 |
| JP | 09-168877 | | 6/1997 |
| JP | 10291320 | | 11/1998 |
| JP | 02000158175 A | * | 6/2000 |
| JP | 2003015086 | | 1/2003 |
| JP | 2003-062683 | | 3/2003 |
| WO | WO 02/076666 | | 10/2002 |
| WO | WO 03/028943 | | 4/2003 |

OTHER PUBLICATIONS

JU55-11827A Utility Model Application; Device for Controlling Ejection of Cutting Fluid in a Machine Tool.

JU04-67944 Utility Model Application; Device for Supplying Machining Fluid in a Machine Tool.

* cited by examiner

LASER MICROMACHINING AND METHODS OF SAME

BACKGROUND

The market for electronic devices continually demands increased performance at decreased costs. In order to meet these requirements the components which comprise various electronic devices may be made more efficiently and to closer tolerances.

Laser micromachining is a common production method for controlled, selective removal of material. However, a desire exists to enhance laser machining performance.

BRIEF DESCRIPTION OF THE DRAWINGS

The same components are used throughout the drawings to reference like features and components wherever feasible.

DETAILED DESCRIPTION OF THE PREFERRED EMBODIMENTS

The embodiments described below pertain to methods and systems for laser micromachining a substrate. Laser micromachining is a production method for controlled, selective removal of substrate material. By removing substrate material, laser micromachining can form a feature into the substrate. Such features can be either through features, such as a slot, which pass through all of the substrate's thickness, or blind features, such as a trench, which pass through a portion of the substrate's thickness.

Laser machining removes substrate material at a laser interaction zone(s) to form a feature into a substrate. Some exemplary embodiments can supply liquid to the laser interaction zone along one or more liquid supply paths to increase the substrate removal rate and/or decrease the incidence of redeposition of substrate material proximate the feature.

Various factors may block a particular liquid supply path from supplying liquid to the laser interaction zone at particular times during the substrate removal process. During laser formation of some features the substrate may obstruct one or more liquid supply paths from reaching the laser interaction zone. Some of the described embodiments can direct liquid at the feature along two or more liquid supply paths so as to adequately supply liquid to the laser interaction zone within the feature.

Examples of laser machining features will be described generally in the context of forming ink feed slots ("slots") in a substrate. Such slotted substrates can be incorporated into ink jet print cartridges or pens, and/or various micro electro mechanical systems (MEMS) devices, among other uses. The various components described below may not be illustrated accurately as far as their size is concerned. Rather, the included figures are intended as diagrammatic representations to illustrate to the reader various inventive principles that are described herein.

Examples of particular feature size, shape, and arrangement are depicted herein. However, any type of feature size and geometry may be fabricated using the inventive methods and apparatuses described herein.

In addition, while several of the embodiments herein describe and discuss ink jet print cartridges or pens, the inventive methods and apparatuses described herein can be used to fabricate any fluid ejection device that ejects any type of fluid for one or more applications.

Exemplary Products

Figure 1:
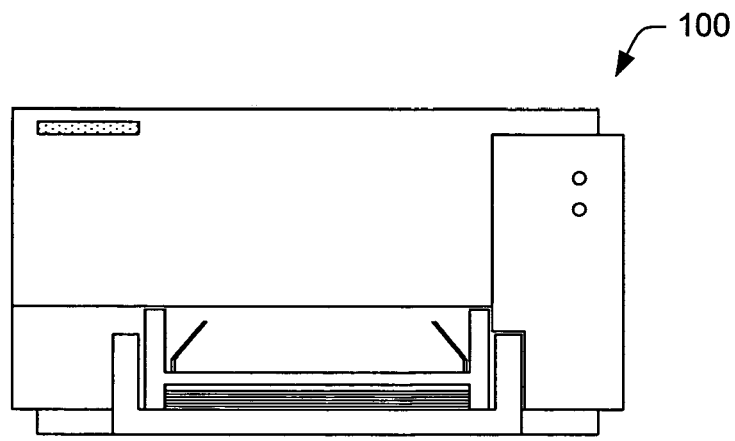
FIG. 1 illustrates a representation of a front elevational view of an exemplary printer in accordance with one exemplary embodiment.
Figure 2:
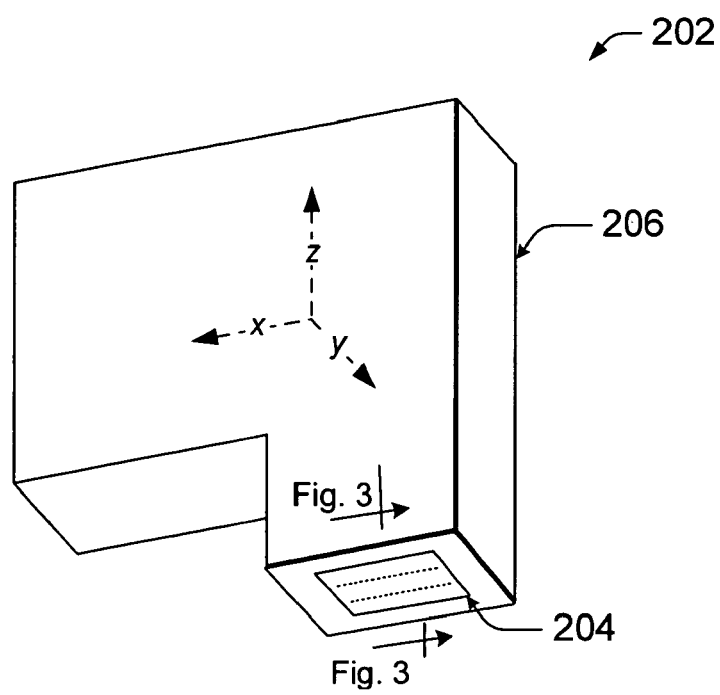
FIG. 2 illustrates a representation of a perspective view of a print cartridge suitable for use in an exemplary printer in accordance with one exemplary embodiment.

FIGS. 1-2 illustrate examples of products which can be produced utilizing at least some of the described embodiments. FIG. 1 shows a diagrammatic representation of an exemplary printing device that can utilize an exemplary print cartridge. In this embodiment the printing device comprises a printer 100. The printer shown here is embodied in the form of an inkjet printer. The printer 100 can be capable of printing in black-and-white and/or in color. The term "printing device" refers to any type of printing device and/or image forming device that employs slotted substrate(s) to achieve at least a portion of its functionality. Examples of such printing devices can include, but are not limited to, printers, facsimile machines, and photocopiers. In this exemplary printing device the slotted substrates comprise a portion of a print head which is incorporated into a print cartridge, an example of which is described below.

FIG. 2 shows a diagrammatic representation of an exemplary print cartridge 202 that can be utilized in an exemplary printing device. The print cartridge is comprised of a print head 204 and a cartridge body 206 that supports the print head. Though a single print head 204 is employed on this print cartridge 202 other exemplary configurations may employ multiple print heads on a single cartridge.

Print cartridge 202 is configured to have a self-contained fluid or ink supply within cartridge body 206. Other print cartridge configurations alternatively or additionally may be configured to receive fluid from an external supply. Other exemplary configurations will be recognized by those of skill in the art.

Figure 3:
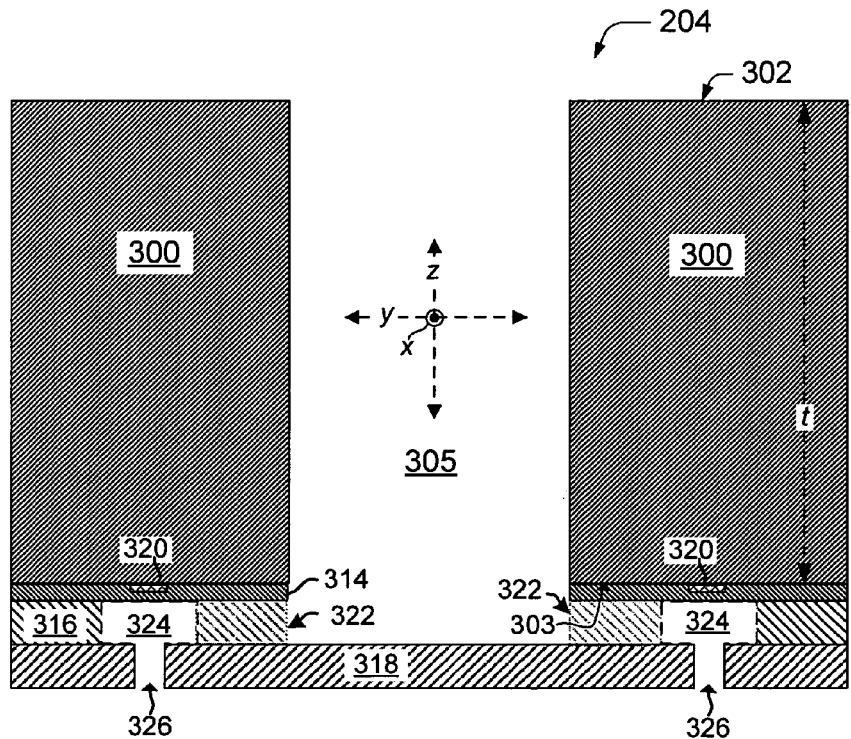
FIG. 3 illustrates a representation of a cross-sectional view of a portion of a print cartridge in accordance with one exemplary embodiment.

FIG. 3 shows a cross-sectional diagrammatic representation of a portion of the exemplary print head 204, taken along line 3-3 in FIG. 2. The view of FIG. 3 is taken transverse an x-axis of a fluid-feed slot (described below), the x-axis extending into and out of the plane of the page upon which FIG. 3 appears.

Here a substrate 300 extends between a first substrate surface ("first surface") 302 and a second substrate surface ("second surface") 303. A slot 305 passes through substrate 300 between first and second surfaces 302, 303.

In this particular embodiment, substrate 300 comprises silicon which either can be doped or undoped. Other substrate materials can include, but are not limited to, glass, silica, ceramics, gallium arsenide, gallium phosphide, indium phosphide, or other material.

Substrate thicknesses (in the z-direction in FIG. 3) can have any suitable dimensions that are appropriate for substrates' intended applications. In some embodiments substrate thicknesses taken relative to the z-direction can range from less than 100 microns to more than 2000 microns. One exemplary embodiment can utilize a substrate that is approximately 675 microns thick. Though a single substrate is discussed herein, other suitable embodiments may comprise a substrate that has multiple components during assembly and/or in the finished product. For example, one such embodiment may employ a substrate having a first component and a second sacrificial component which is discarded at some point during processing.

In this particular embodiment, one or more thin-film layers 314 are positioned over substrate's second surface 303. In at least some embodiments a barrier layer 316 and an orifice plate or orifice layer 318 are positioned over the thin-film layers 314.

In one embodiment, one or more thin-film layers 314 can comprise one or more conductive traces (not shown) and electrical components such as resistors 320. Individual resistors can be selectively controlled via the electrical traces. Thin-film layers 314 also can define in some embodiments, at least in part, a wall or surface of multiple fluid-feed passageways 322 through which fluid can pass. Barrier layer 316 can define, at least in part, multiple firing chambers 324. In some embodiments, barrier layer 316 may, alone or in combination with thin-film layers 314, define fluid-feed passageways 322. Orifice layer 318 can define multiple firing nozzles 326. Individual firing nozzles can be aligned respectively with individual firing chambers 324.

Barrier layer 316 and orifice layer 318 can be formed in any suitable manner. In one particular implementation, both barrier layer 316 and orifice layer 318 comprise thick-film material, such as a photo-imagable polymer material. The photo-imagable polymer material can be applied in any suitable manner. For example, the material can be "spun-on" as will be recognized by the skilled artisan.

After being spun-on, barrier layer 316 then can be patterned to form, at least in part, desired features such as passageways and firing chambers therein. In one embodiment patterned areas of the barrier layer can be filled with a sacrificial material in what is commonly referred to as a 'lost wax' process. In this embodiment orifice layer 318 can be comprised of the same material as the barrier layer and be formed over barrier layer 316. In one such example orifice layer material is 'spun-on' over the barrier layer. Orifice layer 318 then can be patterned as desired to form nozzles 326 over respective chambers 324. The sacrificial material then is removed from the barrier layer's chambers 324 and passageways 322.

In another embodiment barrier layer 316 comprises a thick-film, while the orifice layer 318 comprises an electroformed nickel material. Other suitable embodiments may employ an orifice layer which performs the functions of both a barrier layer and an orifice layer.

In operation a fluid, such as ink, can enter slot 305 from the cartridge body, shown in FIG. 2. Fluid then can flow through individual passageways 322 into an individual firing chamber 324. Fluid can be ejected from the firing chamber when an electrical current is passed through an individual resistor 320. The electrical current can heat the resistor sufficiently to heat some of the fluid contained in the firing chamber to its boiling point so that it expands to eject a portion of the fluid from a respectively positioned nozzle 326. The ejected fluid then can be replaced by additional fluid from passageway 322.

The printer and print cartridges described above provide just one example of products which can incorporate substrates formed utilizing the embodiments described below.

Exemplary Systems and Methods

Figure 4:
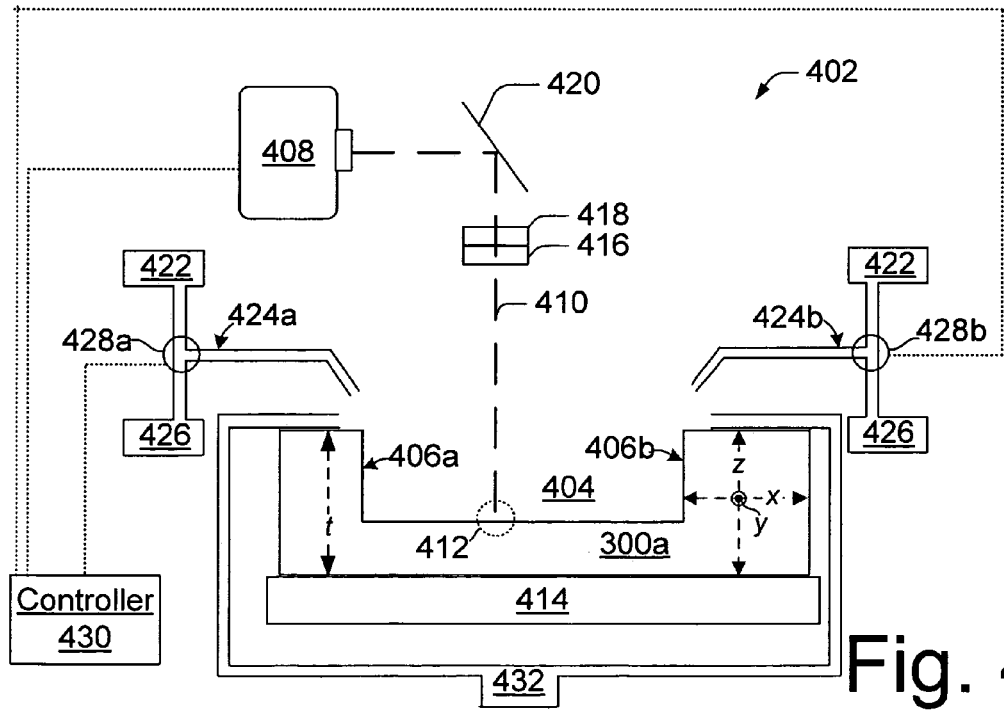
FIG. 4 illustrates a front elevational view of an exemplary laser machining apparatus in accordance with one embodiment.

FIG. 4 shows a cross-sectional diagrammatic representation of an exemplary apparatus or laser machine 402 capable of micromachining a substrate 300a to form a feature 404 therein. Laser machine 402 comprises a means for generating optical energy sufficient to remove substrate material to form feature 404. Feature 404 can have various configurations including blind features and through features. A blind feature passes through less than an entirety of the substrate's thickness t measured in the z direction. A feature which extends all the way through the thickness t becomes a through feature. In the illustrated embodiment feature 404 comprises a blind feature extending along the x-axis between a first feature end 406a and a second feature end 406b.

Laser machine 402 can have a laser source 408 capable of emitting a laser beam 410. The laser beam can contact, or otherwise be directed at, substrate 300a. Exemplary laser beams such as laser beam 410 can provide sufficient energy to energize substrate material at which the laser beam is directed. Energizing can comprise melting, vaporizing, exfoliating, phase exploding, ablating, reacting, and/or a combination thereof, among others processes. The substrate that laser beam 410 is directed at and the surrounding region containing energized substrate material is referred to in this document as a laser interaction region or zone 412. In some exemplary embodiments substrate 300a can be positioned on a fixture 414 for laser machining. Suitable fixtures should be recognized by the skilled artisan. Some such fixtures may be configured to move the substrate along x, y, and/or z coordinates.

Various exemplary embodiments can utilize one or more lenses 416 to focus or to expand laser beam 410. In some of these exemplary embodiments, laser beam 410 can be focused in order to increase its energy density to machine the substrate more effectively. In these exemplary embodiments the laser beam can be focused with one or more lenses 416 to achieve a desired geometry where the laser beam contacts the substrate 300a. In some of these embodiments a shape can have a diameter in a range from about 5 microns to more than 100 microns. In one embodiment the diameter is about 30 microns. Also laser beam 410 can be pointed directly from the laser source 408 to the substrate 300a, or pointed indirectly through the use of a galvanometer 418, and/or one or more mirror(s) 420.

In some exemplary embodiments laser machine 402 also can have one or more liquid supply structures for selectively supplying, from one or more nozzles at any given time, a liquid or liquids 422 to the laser interaction region 412 and/or other portions of substrate 300a. This embodiment shows two liquid supply structures 424a, 424b. Examples of suitable liquids will be discussed in more detail below. In some embodiments, liquid supply structures also may supply one or more gases 426 such as assist gases. Some of these embodiments may utilize dedicated gas supply structures while other embodiments such as the embodiment depicted in FIG. 4 can deliver gas 426 via liquid supply structures 424a, 424b. Examples of gas delivery and suitable gases will be discussed in more detail below.

One or more flow regulators can be utilized to regulate the flow of liquid and/or gas to the substrate. The present embodiment employs two flow regulators 428a, 428b. Some embodiments can utilize a controller 430 to control the function of laser source 408 and flow regulators 428a, 428b among other components.

Liquid 422 can be supplied at various rates during laser machining. For example, one suitable embodiment utilizing water as a suitable liquid delivers 0.1 gallons/hour to the substrate. Other suitable embodiments can supply water at rates that range from less than 0.05 gallons/hour to at least about 0.4 gallons/hour.

Some exemplary embodiments also can utilize a debris extraction system 432 that can remove vaporized substrate material and/or molecules formed from substrate material and a component of the liquid and/or assist gas, as well as various other molecules. In some embodiments the debris extraction system can comprise a vacuum system and filtration system positioned to evacuate material in proximity to the laser beam and substrate.

Figure 5:
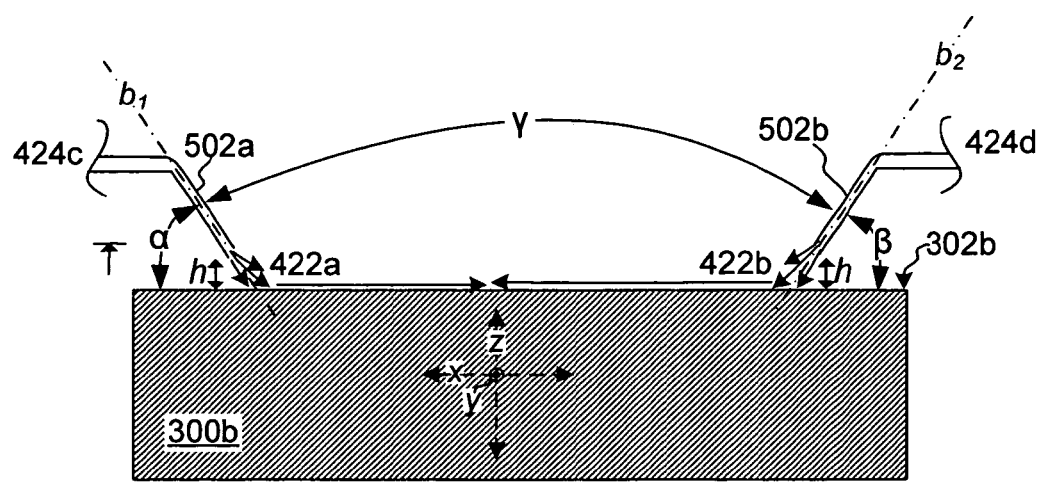
FIGS. 5, 5b-5e and 5g illustrate cross-sectional representations of process steps for laser machining an exemplary substrate in accordance with one embodiment.
Figure 5A:
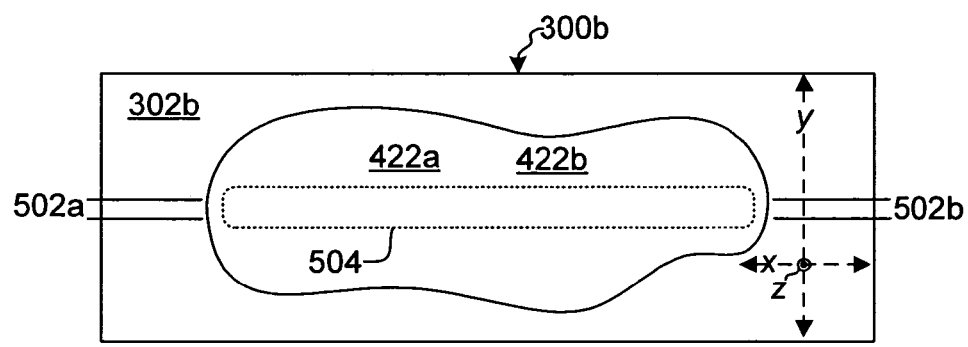
FIGS. 5a and 5f each illustrate representations of top views of portions of an exemplary laser machine and associated substrate in accordance with one exemplary embodiment.
Figure 5B:
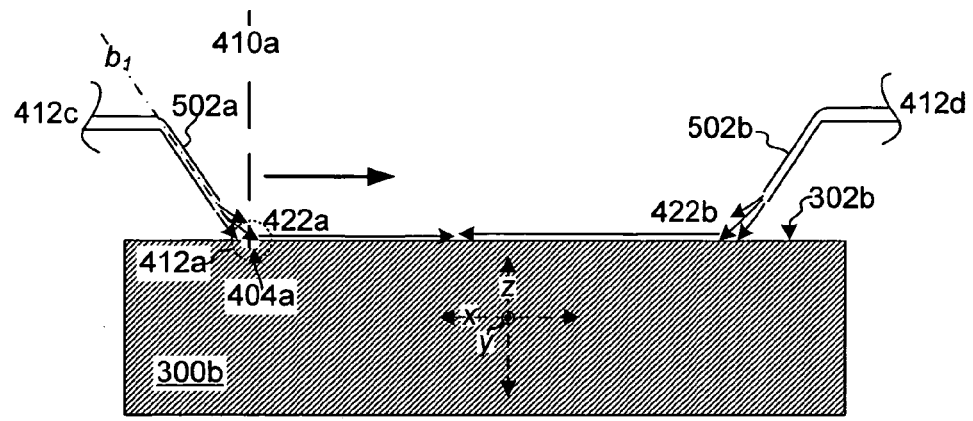
Figure 5C:
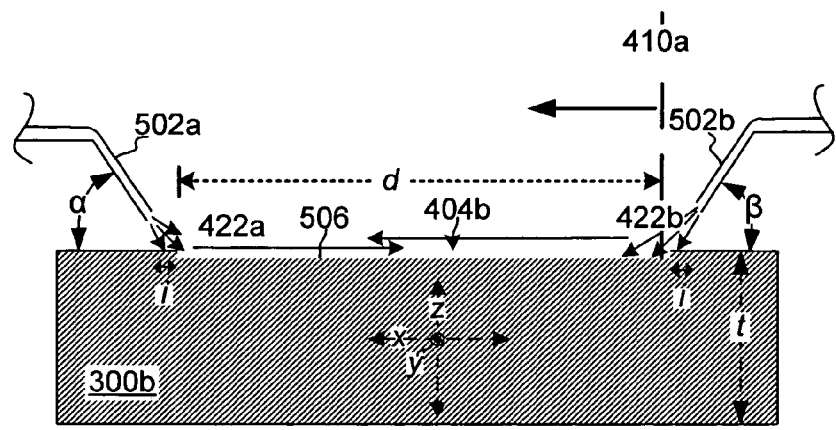
Figure 5D:
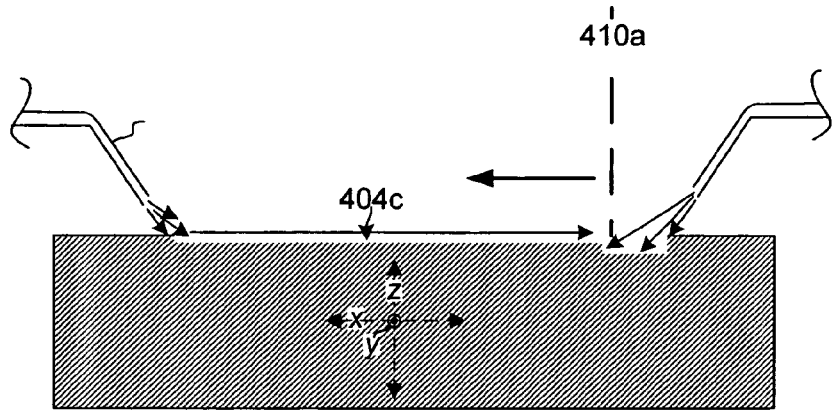
Figure 5E:
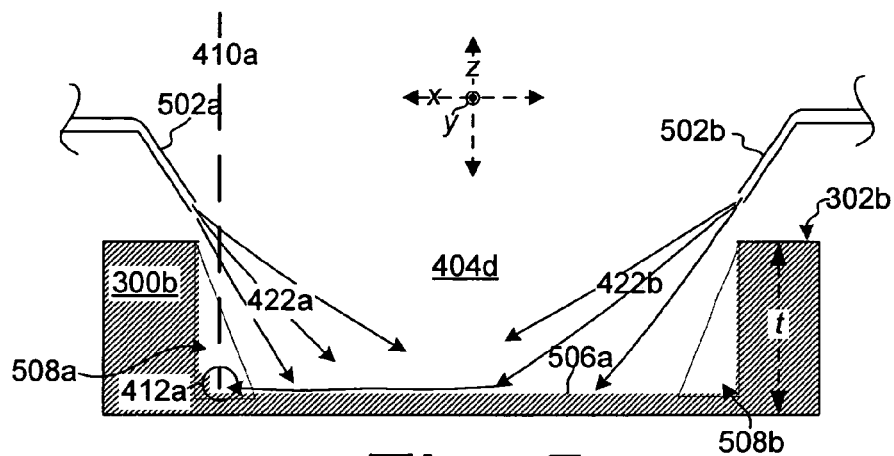
Figure 5F:
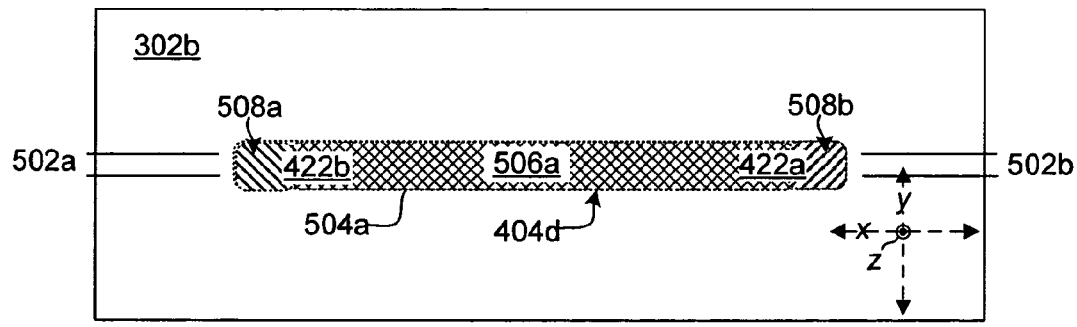
Figure 5G:
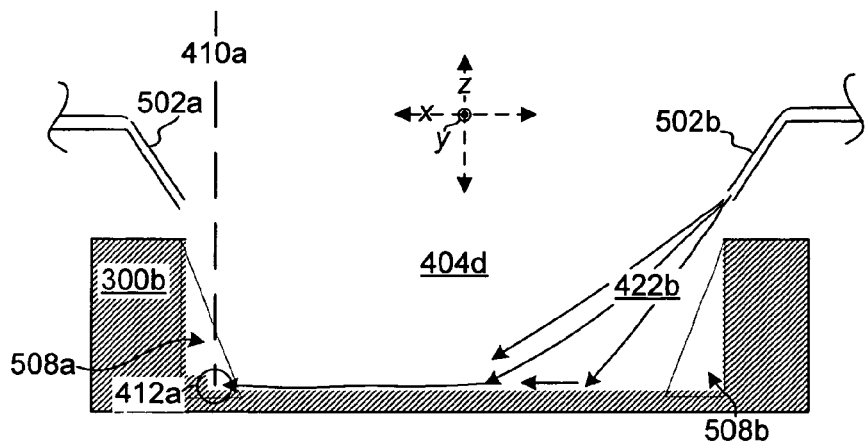

FIGS. 5-5g describe one exemplary method for laser machining a substrate. FIGS. 5, 5b-5e and 5g show process steps for forming a feature in a substrate. Each of these figures illustrates a diagrammatic representation of a cross-sectional view of a portion of exemplary laser machine which is similar to laser machine 402 shown in FIG. 4. FIGS. 5a and 5f show top views of a substrate 300b at various stages of the laser machining process.

As shown in FIG. 5 liquid supply structures 424c, 424d are configured to supply liquid to substrate 300b during the laser machining process. As shown here, liquid supply structures 424c, 424d comprise nozzles 502a, 502b. In this embodiment nozzles 502a, 502b terminate approximately 5-10 millimeters above first surface 302b in the z-direction as indicated generally by designator h. Other dimensions can also provide suitable embodiments.

Nozzles 502a, 502b have nozzle bores $b_1$, $b_2$ from which a direction of the path in which liquid 422a, 422b travels is defined. For purposes of explanation in this embodiment, nozzle bores $b_1$, $b_2$ are utilized to identify individual liquid supply paths from individual nozzles 502a, 502b and respectfully delivered liquid 422a, 422b. Liquids 422a, 422b from individual nozzles 502a, 502b are specifically identified for the purposes of explanation as will become apparent below.

In this embodiment the nozzle bores $b_1$, $b_2$ are oriented at angles $\alpha$, $\beta$ respectively relative to first surface 302b of substrate 300b. In some embodiments angles $\alpha$, $\beta$ are acute angles relative to substrate's first surface 302b. In this particular embodiment angles $\alpha$, $\beta$ comprise about 50 degrees and the first and second bores $b_1$, $b_2$ are oriented about 80 degrees apart as indicated by designator $\gamma$. Other angles also can provide suitable embodiments.

In this illustrated embodiment liquid directed at substrate surface 302b tends to flow across the substrate surface generally toward the opposing nozzle. For example, liquid 422a directed along nozzle bore axis $b_1$ by nozzle 502a tends to contact substrate surface 302b and to flow toward nozzle 502b. This may be seen more clearly by viewing both FIGS. 5 and 5a.

FIG. 5a shows a top view of substrate 300b at first surface 302b. Liquids 422a, 422b generally are covering a portion of first surface 302b lying between nozzles 502a and 502b. In this instance the liquid also is covering a first footprint 504 of a feature to be formed into the substrate in first surface 302b. Liquids 422a, 422b can be delivered effectively to first footprint 504 by individual nozzles 502a, 502b and/or both nozzles in combination.

As shown in FIG. 5b laser beam 410a is directed at substrate 300b. Laser beam 410a removes substrate material at laser interaction zone 412a to form a shallow feature 404a in the substrate through first surface 302b. Liquid 422a is supplied to laser interaction zone 412a directly along path $b_1$ from nozzle 502a. Liquid 422b also may be supplied to the laser interaction zone 412a from nozzle 502b directly or after contacting and deflecting across surface 302b.

As shown here, laser beam 410a is orthogonal to first surface 302b of substrate 300b, though other configurations can provide satisfactory embodiments. In this embodiment, laser beam 410a will be moved generally along the x axis from left to right of the page on which the figure appears to continue forming feature 404a. In subsequent figures the feature is assigned new alphabetic suffixes as the laser machining process progresses.

FIG. 5c shows a subsequent view where laser beam 410a continues to remove additional substrate material to form feature 404b. As shown here laser beam 410a has completed one pass over substrate 303b from left to right and subsequently moves from right to left. The laser beam's range of movement or scan path along the x-axis is indicated generally by dimension d which in this instance is also the dimension of feature 404b in the x-direction or axis. Orientation of nozzles 502a, 502b along acute angles $\alpha$, $\beta$ can allow the nozzles to remain outside of the scan path while delivering liquid to feature 404b. In this particular embodiment nozzles 502a, 502b are each positioned about 5-10 millimeters back from feature 404d in the x-direction as indicated generally by designator i. As such, in this embodiment, a minimum distance between the nozzles 502a, 502b is d plus 10-20 millimeters. Other dimensions can also provide suitable embodiments.

As shown in FIG. 5c, feature 404b is defined additionally, at least in part, by its bottom surface 506. At this point feature 404b is relatively shallow compared to substrate thickness t, and one or both nozzles may supply liquid to the feature.

FIG. 5d shows a further subsequent view in the laser machining process. In this instance laser beam 410a is moving right to left, removing additional substrate material to form feature 404c. For purposes of illustration linear laser movement is depicted herein, but the skilled artisan should recognize other suitable laser movement patterns utilized for feature formation such as a 'racetrack' pattern.

FIG. 5e shows a subsequent view where laser beam 410a has completed multiple passes over substrate 300b to form feature 404d through more than a majority of the substrate's thickness t. At this point feature 404d is formed through approximately 80% of the substrate's thickness t. Feature 404d is defined, at least in part, by bottom surface 506a. Laser interaction zone 412a is depicted on the extreme left side of feature 404d. At this point in the laser machining process laser interaction zone 412a is located in a "shadow zone or region" of feature 404d. A shadow region can comprise a region of a feature to which a particular nozzle does not have a direct completely unobstructed path for delivering liquid. As depicted in FIG. 5e there are two shadow zones 508a, 508b.

At this point in the laser machining process, a single nozzle may be partially or completely obstructed from delivering liquid to the laser interaction zone as desired. For example, nozzle 502a may lack a direct completely unobstructed path for delivering liquid 422a to laser interaction zone 412a located within shadow zone 508a. Among other reasons, liquid delivery may be partially or completely obstructed in some embodiments due to substrate surface 302b physically impeding the liquid.

Liquid delivery to feature 404d may be seen more clearly in FIG. 5f which shows a top view of feature 404d similar to that depicted in FIG. 5a. FIG. 5f shows a second footprint 504a defined by bottom surface 506a. Liquid 422a from nozzle 502a does not generally reach shadow region 508a. Similarly, liquid 422b from nozzle 502b does not generally reach shadow region 508b. Utilizing a combination of nozzles 502a and 502b however can effectively deliver fluid over the entire second footprint 504a at bottom surface 506a as feature depth increases as a percentage of thickness t.

FIG. 5g shows an alternative embodiment depicted in a view similar to that shown in FIG. 5e where laser interaction zone 412a is depicted at the extreme left side of feature 404d and within shadow region 508a. In this particular embodiment a controller, such as controller 422 described in relation to FIG. 4, may abate or shut-off the flow of liquid from a particular nozzle or nozzles during a portion of the laser machining process. For example, in one particular embodiment, nozzle 502a may be shut off when the laser interaction zone 412a is in shadow region 508a to allow liquid from nozzle 502b to effectively supply liquid to the laser interaction zone. Shutting off liquid flow from nozzle 502a may allow liquid to be distributed more effectively to laser interaction zone 412a by nozzle 502b. Correspondingly, nozzle 502b may be shut off when the laser interaction zone is on the right side of the feature in shadow region 508b to allow liquid flow from nozzle 502a to effectively reach the laser interaction zone.

As depicted in FIG. 5g, shutting off the flow of liquid from one of the nozzles may increase the effective delivery from the opposing nozzle by reducing potential interference caused by the intersection of the two or more liquid streams. In some embodiments the reduced interference can result in a less turbulent, more uniform volume of liquid reaching the laser interaction zone.

The laser machining process steps described above in relation to FIGS. 5-5g can be repeated until the feature passes all the way through the substrate's thickness t to form the blind feature into a through feature. Alternatively or additionally, an exemplary laser machining process may be utilized in combination with another substrate removal process to form a feature in a substrate. For example, a process such as etching may be utilized to remove substrate material and laser machining may be utilized to remove additional substrate material to form a desired feature such as a slot.

Figure 6:
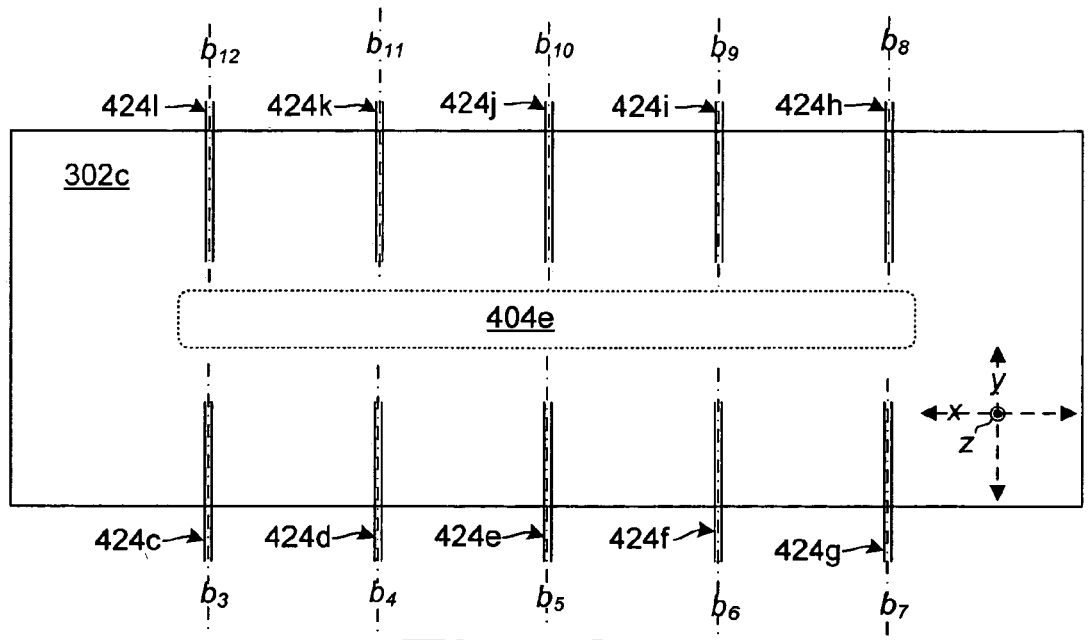
FIGS. 6-7 each illustrate representations of top views of portions of an exemplary laser machine and associated substrate in accordance with one exemplary embodiment.
Figure 7:
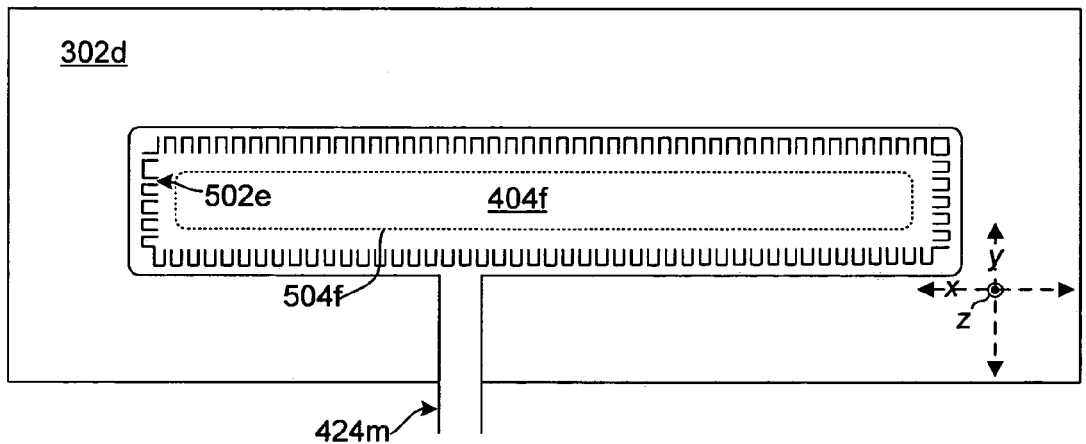

FIGS. 6-7 each show a top view of alternative embodiments utilizing multiple nozzles effectively to direct liquid at a substrate during laser machining to form a feature into the substrate.

FIG. 6 depicts an embodiment utilizing ten independently controllable liquid supply structures 424c-424l positioned proximate feature 404e formed in substrate's first surface 302c. Each of the ten liquid supply structures is configured to deliver liquid along a distinct liquid supply path indicated here as $b_3$-$b_{12}$. In this embodiment, effective liquid flow during feature formation can be achieved by selectively controlling the function of individual liquid supply structures depending upon the location of the laser interaction zone during the laser machining process.

FIG. 7 depicts an embodiment utilizing a single liquid supply structure 424m comprising a plurality of approximately 100 nozzles. An example of which is indicated here as nozzle 502e. In this embodiment the plurality of nozzles are oriented in a configuration which approximates a footprint 504f of feature 404f formed in substrate's first surface 302d. Such a configuration can effectively supply liquid to the substrate during the laser machining process even if one or more nozzles are blocked from reaching a region of the feature. For purposes of clarity, liquid flow paths corresponding to the nozzles are not shown, but are described in several embodiments described above.

Various liquid supply structure types can be employed in suitable embodiments. For example, suitable liquid supply structures can comprise air brushes which deliver a liquid aerosol in a pressurized gas. Other suitable liquid supply structures can employ pressurized air or other gas(es) and introduce a liquid utilizing a venturi. Still other embodiments simply may employ pressurized liquid with or without a nozzle to configure the flow as desired. Liquid can be delivered to the laser interaction zone in any suitable form. For example the liquid may comprise an atomized mist, aerosol, droplets and/or a liquid which is not generally interspersed with gas molecules.

Water is utilized as a suitable liquid in the embodiments described above. Other suitable liquids can comprise among others, organic solvents, water based acids and bases, and water based surfactants among others.

The described embodiments can utilize a laser beam to form a feature into a substrate. In several embodiments the laser beam cuts with greater efficiency and speed by supplying liquid such as water to the laser interaction zone where the laser beam energizes substrate material. Some of the described embodiments can direct liquid at the feature along two or more pathways to ensure adequate liquid supply to the laser interaction zone within the feature.

Although the inventive concepts have been described in language specific to structural features and methodological steps, it is to be understood that the appended claims are not limited to the specific features or steps described. Rather, the specific features and steps are disclosed as preferred forms of implementing the inventive concepts.

What is claimed is:

1. An apparatus comprising:
   at least one laser source that supplies a laser beam to operate on a substrate at a laser interaction zone to form a feature in the substrate;
   a first nozzle oriented to deliver liquid along a first liquid supply path to the feature, so that the liquid is delivered to the laser interaction zone; and,
   at least a second different nozzle oriented to deliver liquid to the laser interaction zone along a second different liquid supply path, wherein the first nozzle and at least the second different nozzle are selectively activated based upon the location of the laser interaction zone in the substrate.

2. The apparatus of claim 1, wherein the first nozzle and the at least a second nozzle comprise a plurality of nozzles oriented to provide liquid in a pattern generally approximating a footprint of the feature.

3. The apparatus of claim 1 further comprising a controller for selectively controlling a delivery of liquid from individual nozzles wherein the controller is configured to shut-off the flow of liquid from the first nozzle to allow the at least a second nozzle to deliver liquid to the laser interaction zone by reducing potential interference caused by intersection of streams of liquid from the first nozzle and the at least a second nozzle.

4. The laser machining apparatus of claim 1, wherein the feature is an elongate feature which extends generally along a long axis between a first feature end and a generally opposing second feature end, and wherein the first nozzle is positioned proximate to the first feature end and the second nozzle is positioned proximate to the second feature end.

5. The apparatus of claim 1, wherein the first nozzle and the at least a second nozzle are configured to deliver liquid in the form of an atomized mist.

6. The laser machining apparatus of claim 1, wherein the first liquid supply path lies at a 50 degree angle relative to a first substrate surface into which the feature is formed and the second axis lies at a 50 degree angle to the first surface and 80 degrees relative to the second liquid supply path.

7. The laser machining apparatus of claim 6, wherein the first nozzle and the second nozzle each terminate about 10 microns above the first substrate surface into which the feature is formed.

8. The laser machining apparatus of claim 6, wherein the first nozzle is positioned at least about 5 millimeters back from the first feature end and the second nozzle is positioned at least about 5 millimeters from a second feature end.

* * * * *